March 3, 1942.   E. H. HUGENHOLTZ   2,275,298
RADIO COURSE INDICATOR
Filed Nov. 16, 1939
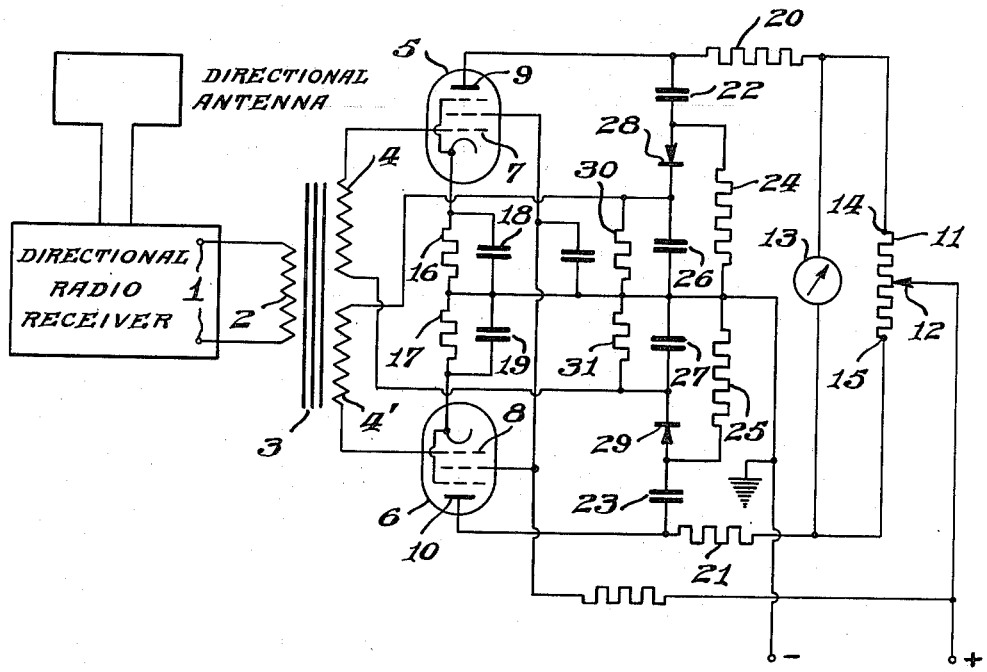
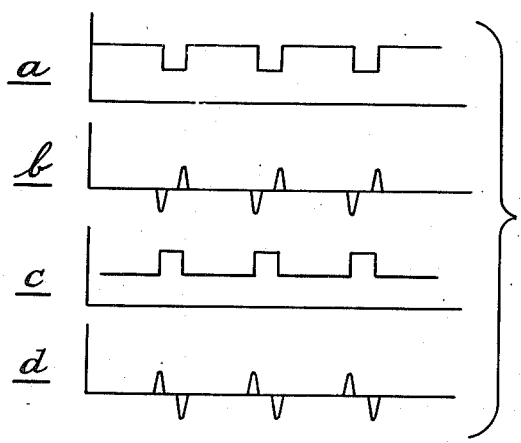
Inventor
Eduard Herman Hugenholtz
By
Attorney Patented Mar. 3, 1942

2,275,298

UNITED STATES PATENT OFFICE 2,275,298

RADIO COURSE INDICATOR

Eduard Herman Hugenholtz, Hilversum, Netherlands, assignor to Radio Corporation of America, a corporation of Delaware Application November 16, 1939, Serial No. 304,692
In the Netherlands December 3, 1938

7 Claims. (Cl. 250—11)

The invention relates to a device for visually indicating deviation from the correct course, which may be advantageously utilized, for example, in airplanes.

When heading for a radio beacon or another transmitter utilized as such, it is desirable to perceive a deviation from the correct course not only by ear but also, or even exclusively, to utilize a device with the aid of which visual indication of possible deviations is insured. In the usual beacon transmitter oscillations are transmitted in different directions, which oscillations are modulated respectively by complementary signals, for example, dots and dashes. In the line of the correct course a continuous tone is perceived in this case; whilst on the one side of the line of the correct course, for example, dashes and on the other side dots predominate. When heading towards another transmitter which is not modulated in the above-mentioned manner with complementary signs, the receiving device itself must be provided, in order to obtain the same result, with a device for periodically altering the directional characteristic of its antenna system.

For obtaining visual indication it is old to supply the complementary signs obtained in any of the above-mentioned ways to an indicating instrument which is constructed in such manner that the pointer remains in the zero position when the receiver is in the line of the correct course, and that when the dashes predominate the pointer reacts by a deflection in one direction and when the dots predominate by a deflection in the opposite direction.

For this purpose use is made, for example, of a device wherein the complementary signs, after being transformed into impulse combinations whose initial sign depends on the direction of deviation, are supplied to the control grids of two push-pull connected tubes, the anode currents of which influence an indicating instrument, and wherein as soon as a current impulse occurs in one of the two tubes both tubes are blocked. Blocking may be brought about in this case by a sudden decrease of the anode voltage of the tubes or by a sudden increase of the negative grid bias.

The invention has for one of its objects the provision of means for indicating visually any deviation from the correct course wherein use is made of two push-pull tubes which influence an indicating device and to the control grids of which the complementary signs are supplied after being transformed into impulse combinations with an initial sign which depends on the direction of deviation. The device according to the invention exhibits the feature that as soon as a current impulse occurs in one of the two tubes the other tube is blocked, which blocking gradually disappears again in the time interval between the two impulse combinations. The device according to the invention offers with respect to the known devices the advantage that an indication is obtained which can more easily be read. The blocking is preferably effected by a sudden increase of the negative grid bias voltage, said increase being controlled by the said current impulse.

The invention will be explained more fully with reference to the accompanying drawing, which represents, by way of example, one embodiment thereof. In the drawing, Fig. 1 shows a circuit diagram of a device for the visual indication of deviations from a course which is to be connected to a receiver which may be adapted for the reception of beacons and/or for the reception of transmitters having a constant directional characteristic; and Fig. 2 shows diagrams of complementary signs and of the impulse combinations derived therefrom.

The indicating device shown in Fig. 1 may be connected by its terminals 1 to the output terminals of a directional radio receiver. To the primary winding 2 of a transformer 3 are supplied the currents obtained after detection of the complementary signs received. These currents have, for example, a duration equal to that of dashes and dots. Dependent on the deviation from the correct course, either the dashes or the dots predominate as is represented in Fig. 2a and Fig. 2c, respectively. These complementary currents produce voltage impulses across the secondary windings 4, 4', as is indicated in Figs. 2b and 2d, respectively. As appears therefrom the impulse combinations have, for predominating dots or dashes, opposite initial signs. The impulse combinations are supplied to the control grids 7 and 8 of two push-pull connected screen-grid tubes 5 and 6 which have a circuit arrangement such that of each impulse combination only the first impulse and, if any, successive impulses of equal polarity are transmitted.

Between the anodes 9 and 10 of the two tubes is located a potentiometer 11 whose sliding contact 12 is connected to the positive terminal of a source of anode voltage. An indicating instrument 13 is connected in parallel with this potentiometer. If the two grids 7 and 8 of the tubes and the terminals 14 and 15 of the potentiometer have equal potentials, the pointer of the indicating instrument occupies the zero position. As soon, however, as an impulse is transmitted by the transformer 3, the grid of one of the two tubes, for example the grid 7 of the tube 5, becomes more positive and the grid 8 becomes more negative. The resulting variation in the potential of the terminals 14 and 15 brings about a deflection of the pointer of the indicating instrument 13 in a determined direction.

To both tubes is supplied a grid bias voltage whose absolute value is but slightly smaller than that of the voltage at which the anode current is suppressed. The consequence thereof is that in the above-mentioned case the anode current of the tube 5 increases more than that of the tube 6 decreases. The negative grid bias voltage which each tube requires for this purpose is taken from resistors 16 or 17, respectively, which are located in the cathode lead of the corresponding tube and which are each shunted by a capacitor 18 or 19, respectively. This method of generating the negative grid voltages offers the advantage that any variation of the anode currents of the tubes due to fluctuations in the anode or heating current source is greatly reduced. If desired, part of the negative grid bias voltage may be taken from a resistor included in the common cathode lead of the tubes.

The arrangement shown is such that as soon as a current impulse occurs in one of the tubes the other tube is blocked due to a sudden increase of the negative grid bias voltage. For this purpose the anode circuits include resistors 20 and 21 connected between the anodes 9, 10 and potentiometer terminals 14, 15 and, through the intermediary of blocking condensers 22 and 23, respectively, to resistors 24 and 25, respectively, which are grounded. Each of the resistors 24 and 25 is bridged by the series connection of a capacitor 26 or 27, respectively, and a rectifier 28 or 29, respectively. Leakage resistors 30 and 31, respectively, are connected between the terminals of the capacitors 26, 27. The leakage resistor 30, which pertains to the anode circuit of the tube 5, forms part of the grid circuit of the tube 6; the leakage resistor 31, pertaining to the anode circuit of the tube 6, is connected in the grid circuit of the tube 5.

If a positive signal voltage impulse is applied to the control grid 7 of the tube 5 a negative voltage impulse is produced across the resistor 20 with the result that the capacitor 26 is charged in such manner that the negative grid bias voltage of the tube 6 suddenly increases and blocking of this tube occurs. Any impulses of an impulse combination which may follow after the said initial impulse have therefore no influence on this tube. Simultaneously with the application of the positive signal voltage impulse to the tube 5 a negative signal voltage impulse is applied to the tube 6. Owing to the above-mentioned normal value of the grid bias voltages of the two tubes there occurs across the resistor 21 a but slight voltage impulse and the negative grid bias voltage of the tube 5 practically does not increase, with the result that after the end of the voltage impulse which is operative for the tube 5 the anode current of this tube acquires again its initial value whereas the tube 6 is blocked. Owing to this the pointer of the indicating instrument does not return to the zero position until the charge of the condenser 26 has disappeared. The choice of the various operating parameters is such that of each impulse combination substantially only the first half-wave, which therefore determines the polarity and the direction of the deflection, is transmitted by one of the tubes, whereas the blocking of the other tube disappears again in the time interval between two impulse combinations. After the end of an impulse combination the tubes have again their initial adjustment and when a next impulse combination occurs either the tube 5 or the tube 6 will become operative dependent on the polarity of the initial impulse.

Since, in contradistinction to the known devices, current is supplied to the indicating instrument also after termination of the initial impulse of an impulse combination, a steady deflection of the pointer and a considerably easier reading of the indicating instrument are insured.

I claim as my invention:

1. A device for indicating visually the deviation from a radio course of the complementary signal type which includes in combination means for receiving said signals, means for transforming said signals into impulse signal combinations with the relative polarity of said initial impulse signals dependent upon the direction of deviation, a pair of push-pull connected tubes each including a control grid and an anode and a cathode and circuits therefor, means for applying said impulse signals to said control grids, an indicating device connected to the anodes of said tubes, means including a pair of rectifiers each respectively connected to the anode circuit of one of said tubes for deriving from the impulse signals applied to said push-pull tubes a controlling voltage, said controlling voltage being derived by rectifying the anode current pulse of the tube to which the more positive impulse is applied, and means for applying said controlling voltage to block the other of said tubes until a second impulse combination is applied.

2. A device for indicating visually the deviation from a radio course of the complementary signal type which includes in combination means for receiving said signals, means for transforming said signals into impulse signal combinations with the relative polarity of initial impulse signals dependent upon the direction of deviation, a pair of push-pull connected tubes each including an anode and a cathode and a control grid and circuits therefor, means for applying said impulse signals to said control grids to change the anode currents of said tubes, an indicating device connected to the anodes of said tubes, means including a pair of rectifiers respectively connected to the anode circuits of said tubes for deriving from the impulse signals applied to said push-pull tubes a negative bias voltage, said negative bias being derived from the rectifier in the anode circuit of the tube having the greater change in anode current, and means for applying said negative bias voltage to the control grid of the tube having the lesser change of anode current to block said tube until a second impulse combination is applied.

3. A course indicator for indicating visually the deviation from a radio course of the complementary signal type including in combination means for receiving said signals, means for transforming said signals into impulse combinations with initial impulses having a polarity dependent upon the direction of deviation, a pair of push-pull connected tubes including input circuits and output circuits, means for applying said impulses to said input circuits, a course indicator connected to said output circuits, said output circuits each including a rectifier, a capacitor and a resistor, said rectifier and capacitor being effectively connected in series, said resistor being effectively connected in shunt to said capacitor whereby the rectified currents charge the capacitor which is effectively shunted by said resistor, and means for connecting respectively said resistors to the input circuit of the other tube, whereby the voltages derived in the output of one tube are applied to control the other tube.

4. In an indicator of the character of claim 1, supplementary bias means for applying an input bias to suppress the anode current of each of said tubes.

5. In an indicator of the character of claim 1, means included in the cathode circuits of said push-pull tubes for deriving a grid bias voltage slightly less than the bias voltage which suppresses the anode current.

6. In an indicator of the character of claim 3, further characterized in that the push-pull tube input and output circuits include cathode circuits, and means in said cathode circuits for deriving a grid bias voltage slightly less than the bias voltage which suppresses the anode current.

7. In an indicator of the character of claim 3, supplementary bias means for applying an input bias to suppress the output current of each of said tubes.

EDUARD HERMAN HUGENHOLTZ.